UNITED STATES PATENT OFFICE.

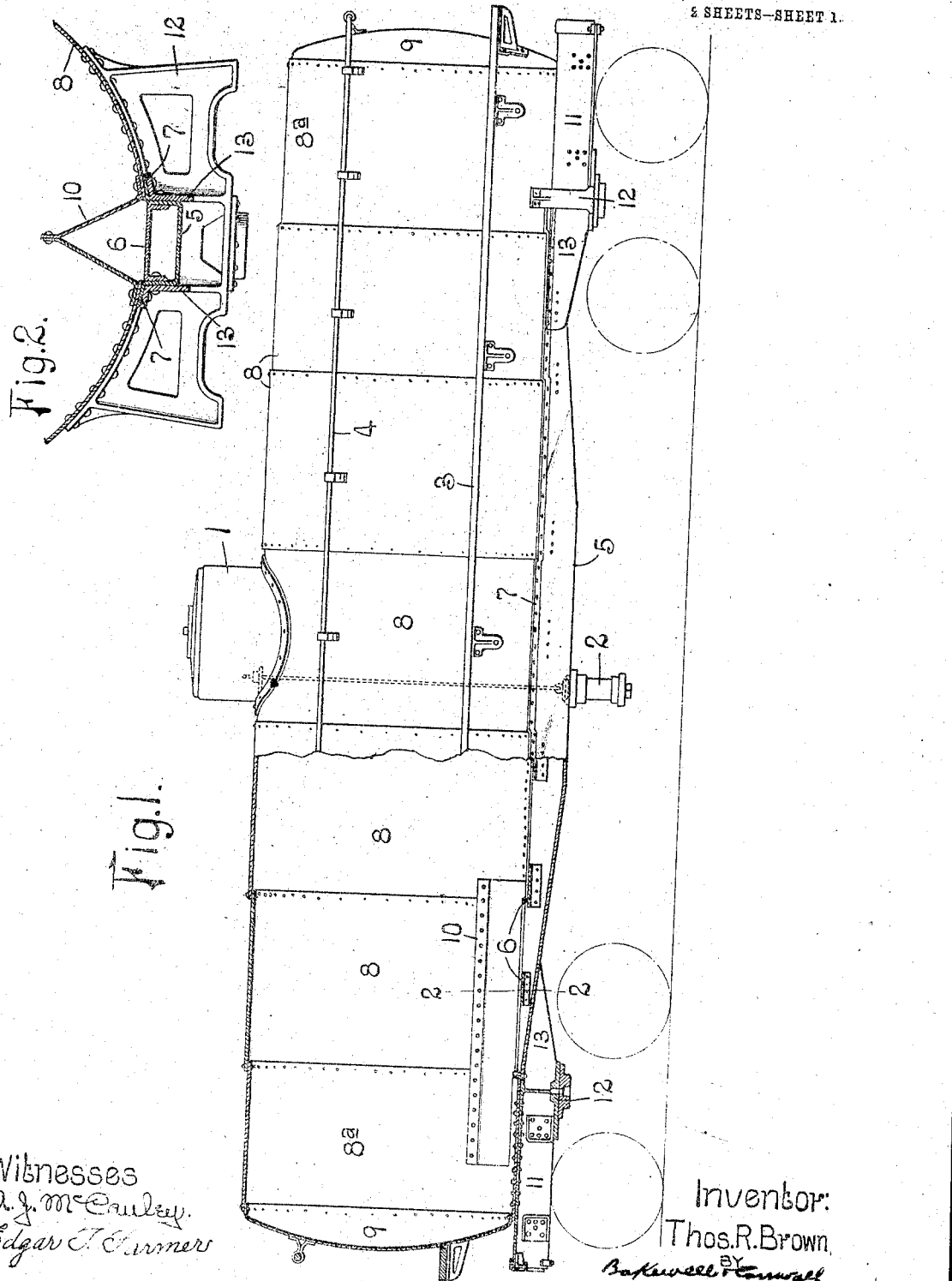

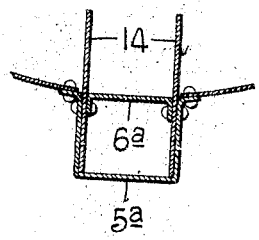
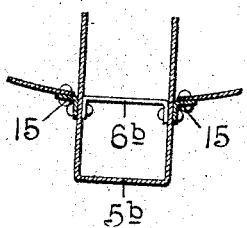
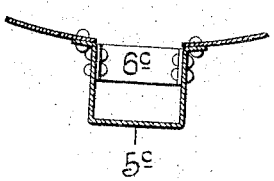
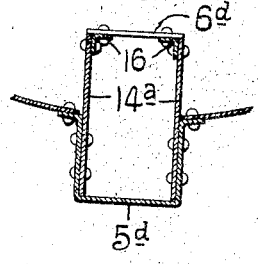
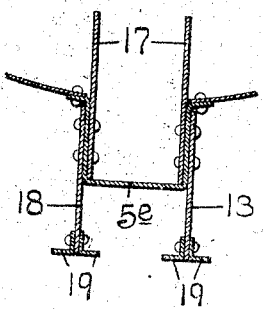
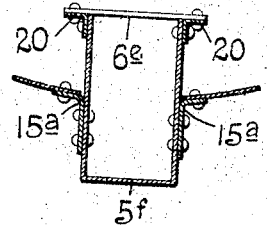
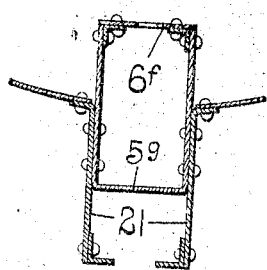
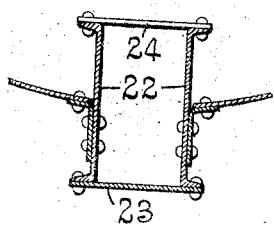

THOMAS R. BROWN, OF NEW YORK, N. Y., ASSIGNOR TO AMERICAN CAR & FOUNDRY COMPANY, OF ST. LOUIS, MISSOURI, A CORPORATION OF NEW JERSEY.

TANK-CAR.

No. 846,392.    Specification of Letters Patent.    Patented March 5, 1907.

Application filed December 1, 1906. Serial No. 345,855.

*To all whom it may concern:*

Be it known that I, THOMAS R. BROWN, a citizen of the United States, residing at the city, county, and State of New York, have invented a certain new and useful Improvement in Tank-Cars, of which the following is a full, clear, and exact description, such as will enable others skilled in the art to which it appertains to make and use the same, reference being had to the accompanying drawings, forming part of this specification, in which—

Figure 1 is a side elevational view, partly in vertical section, of a tank-car constructed in accordance with my invention. Fig. 2 is a sectional view taken on the line 2 2 of Fig. 1; and Figs. 3 to 10, inclusive, illustrate modified forms of longitudinal sills.

This invention relates to new and useful improvements in tank-cars.

In a tank-car constructed in accordance with my invention the tank structure is reinforced by a longitudinal sill which forms a part of the tank. This longitudinal sill ties the tank structure together, receives the buffing and pulling stresses, and is arranged in such a manner that the tank structure above said sill is protected from the violent shocks of buffing and pulling.

Referring to the drawings, the tank is provided with a suitable filling-dome 1 and a discharge-valve 2.

3 indicates a running-board, and 4 is a hand-rail.

5 indicates a trough-shaped longitudinal sill which is preferably deepest at the center and tapered toward its ends. The vertical webs of the sill 5 are spaced apart at the top by short channels 6. This sill is provided with top flanges 7, which are riveted to the lower edges of circumferential tank-sheets 8. The tank-sheets 8 are telescopically arranged and riveted together at their overlapping edges. The ends of the longitudinal sill 5 are riveted to end tank-sheets 8ª, which preferably form a complete circle. The ends of the tank are closed by heads 9.

10 indicates a tank-brace located inside of and near the ends of the tank. This brace, which is riveted to the bottom of the tank, serves as a continuation of the longitudinal sill and reinforces the tank structure adjacent the draft-sills 11 and body-bolsters 12.

The body-bolsters and draft members, which may be of any suitable construction, are secured together and riveted to the bottom of the tank. Extensions 13 are formed integral with or secured to the body-bolsters. These extensions are arranged longitudinally the tank and riveted thereto.

The longitudinal sill 5 connects the body-bolsters and, if desired, could extend from end to end of the tank. The cross-section of this sill may be varied in many ways. For example, Fig. 3 illustrates a modification in which vertically-arranged plates 14 are interposed between the vertical webs of a sill 5ª and a channel 6ª, said plates extending into the tank.

In the modification shown in Fig. 4 the vertical webs of a sill 5ᵇ extend into the tank and are spaced apart by means of channels 6ᵇ. Angles 15 connect the sill to the tank.

In Fig. 5 the vertical webs of the sill 5ᶜ are spaced apart by flanged plates 6ᶜ.

Fig. 6 illustrates a form in which vertical plates 14ª are riveted to the sill 5ᵈ. These plates extend into the tank and are provided with integral flanges or angles 16 at their upper edge, to which connecting-bars 6ᵈ are riveted.

Fig. 7 illustrates a modification in which the trough-shaped sill 5ᵉ is reinforced by a pair of vertical plates 17, which extend into the tank, and another pair of plates 18, which extend below the tank. Angles 19 are riveted to the lower edge of the plates 18.

In the modification shown in Fig. 8 the vertical webs of a sill 5ᶠ extend into the tank and are connected thereto by means of angles 15ª. Angles 20 are riveted to the upper edges of said webs, and connecting-bars 6ᵉ are riveted to said angles.

Fig. 9 illustrates a form in which depending plates 21 are riveted to the tank and reinforced by angles at their lower edges. A trough-shaped member 5ᵍ is arranged between and riveted to the plates 21. The member 5ᵍ extends into the tank and is provided with a perforated cover-plate 6ᶠ.

In the form in Fig. 10 channels 22 are spaced apart and secured to the tank. A continuous plate 23 is riveted to the lower flanges of the channels 22. The upper flanges of these channels are connected together by means of bars 24, which are riveted to said channels.

I am aware that minor changes in the construction, arrangement, and combination of the several parts of my device can be made and substituted for those herein shown and described without departing from the nature and principle of my invention.

Having thus described the invention, what is claimed as new, and desired to be secured by Letters Patent, is—

1. A tank-car without outside sills in which a trough-shaped longitudinal sill is riveted to the tank said sill forming the sole supporting frame member for the tank; substantially as described.

2. In a tank-car without outside sills, a trough-shaped longitudinal sill which is flanged at the top and riveted to the tank said sill forming the sole supporting frame member for the tank; substantially as described.

3. In a tank-car without outside sills, a longitudinal sill or sills provided with vertical webs which are connected to the lower edges of circumferential tank-sheets; substantially as described.

4. In a tank-car without outside sills, a tank comprising circumferential sheets, the lower edges of which are spaced apart and connected to the vertical webs of a longitudinal sill or sills; substantially as described.

5. A tank-car in which body-bolsters are connected only by a longitudinal sill which forms a part of the tank said sill forming the sole supporting frame member for the tank; substantially as described.

6. A tank-car without outside sills in which the lower edges of circumferential tank-sheets are spaced apart and riveted to a longitudinal sill; substantially as described.

7. A tank-car without outside sills in which the lower edges of circumferential tank-sheets are spaced apart and riveted to a trough-shaped longitudinal sill; substantially as described.

8. A tank-car without outside sills in which a longitudinal sill is riveted to the lower edges of circumferential tank-sheets; substantially as described.

9. In a tank-car without outside sills, a longitudinal sill or sills provided with vertical webs and top flanges which are connected to the lower edges of circumferential tank-sheets; substantially as described.

10. In a tank-car without outside sills, a longitudinal sill or sills provided with vertical webs which are connected at the top and bottom, said sill or sills being secured to the lower edges of circumferential tank-sheets; substantially as described.

11. In a tank-car without outside sills, a longitudinal sill provided with vertical webs which are connected at the bottom by an integral sheet and connected at the top by interposed spacing members; substantially as described.

12. In a railway-car without outside sills, body-bolsters connected by a trough-shaped longitudinal sill which is flanged at its upper edges; substantially as described.

13. In a railway-car without outside sills, body-bolsters connected by a trough-shaped longitudinal sill which is deepest at its middle portion and provided with flanges at its upper edge; substantially as described.

14. A railway-car without outside sills in which the buffing and pulling stresses are transmitted to a trough-shaped longitudinal sill which is flanged at its upper edges; substantially as described.

15. A tank-car in which the tank is reinforced adjacent the draft members and body-bolsters by internal tank-braces which terminate short of the center of the car; substantially as described.

16. In a tank-car, the combination with a tank, of draft members, body-bolsters connected by a longitudinal sill which terminates at the bolster-points, and internal tank-braces which terminate short of the center of the car, said braces being secured to the tank adjacent said draft members and body-bolsters; substantially as described.

17. In a tank-car, the combination with a tank, of body-bolsters provided with extensions which are arranged longitudinally the tank and secured to the under side thereof, a longitudinal sill or sills connecting said body-bolsters and interiorly-arranged braces connected to the ends of said longitudinal sill; substantially as described.

18. A tank having an outwardly-projecting stiffening member and inwardly-extending braces, said braces being arranged only at the ends of the stiffening member.

19. A tank-car having a trough-shaped supporting member whose vertical side walls extend up into the tank.

20. A tank-car having a trough-shaped supporting member whose vertical side walls extend up into the tank, and whose upper edges are reinforced.

21. A tank-car having a trough-shaped supporting member whose vertical side walls extend up into the tank where they are connected.

22. A tank-car having a trough-shaped supporting member whose vertical side walls extend down below said trough-shaped member.

23. A tank-car having a trough-shaped supporting member whose vertical side walls extend down below said trough-shaped member and whose lower edges are reinforced.

In testimony whereof I hereunto affix my signature, in the presence of two witnesses, this 20th day of November, 1906.

THOMAS R. BROWN.

Witnesses:
HENRY F. TRAUGH,
H. P. FIELD, Jr.